United States Patent
Hitchens et al.

[11] Patent Number: 5,961,796
[45] Date of Patent: Oct. 5, 1999

[54] BIPOLAR MEMBRANES WITH FLUID DISTRIBUTION PASSAGES

[75] Inventors: G. Duncan Hitchens, Bryan; Shivaun Archer, College Station; Charles L. Tennakoon, College Station; Anuncia Gonzalez-Martin, College Station; Alan J. Cisar, Cypress, all of Tex.

[73] Assignee: Lynntech, Inc., College Station, Tex.

[21] Appl. No.: 08/868,617

[22] Filed: Jun. 3, 1997

[51] Int. Cl.⁶ .................................................. C25B 9/00
[52] U.S. Cl. ..................... 204/252; 204/282; 204/296; 429/30; 429/33; 429/38
[58] Field of Search ................................... 204/252, 253, 204/254, 255, 267, 268, 296, 282; 429/34, 35, 36, 38, 30, 33

[56] References Cited

U.S. PATENT DOCUMENTS

| | | | |
|---|---|---|---|
| 2,829,095 | 4/1958 | Oda et al. | 204/98 |
| 4,118,299 | 10/1978 | Maget | 204/180 P |
| 4,214,969 | 7/1980 | Lawrance | 204/255 |
| 4,804,451 | 2/1989 | Palmer | 204/301 |
| 4,851,100 | 7/1989 | Hodgdon et al. | 204/296 |
| 4,927,800 | 5/1990 | Nishiki et al. | 502/349 |
| 5,262,250 | 11/1993 | Watanabe | 429/33 |
| 5,288,385 | 2/1994 | Kedem et al. | 204/296 |
| 5,308,466 | 5/1994 | Ganzi et al. | 204/151 |
| 5,635,039 | 6/1997 | Cisar et al. | 204/296 |

FOREIGN PATENT DOCUMENTS

| | | |
|---|---|---|
| 0 422 453 A2 | 9/1990 | European Pat. Off. . |
| 0 563 321 B1 | 12/1991 | European Pat. Off. . |
| 6-67733 | 8/1992 | Japan . |
| 7-249318 | 3/1994 | Japan . |

OTHER PUBLICATIONS

Nonobe, Tasuhiro (Toyota Motor Co. Ltd. Japan), 1995, "Electrolyte membranes, their manufacture, and fuel cells," Elects Plus: Batteries & Fuel Cells, Issue I, 1996.

*Primary Examiner*—Bruce F. Bell
*Attorney, Agent, or Firm*—Streets & Associates

[57] ABSTRACT

The present invention provides a bipolar membrane and methods for making and using the membrane. The bipolar membrane comprises a cation-selective region, an anion-selective region, an interfacial region between the anion-selective region and the cation-selective region, and means for delivering fluid directly into the interfacial region. The means for delivering fluid includes passages that may comprise a fluid-permeable material, a wicking material, an open passage disposed within the membrane or some combination thereof. The passages may be provided in many shapes, sizes and configurations, but preferably deliver fluid directly to the interfacial region so that the rate of electrodialysis is no longer limited by the diffusion of fluid through the cation- or anion-selective regions to the interfacial region.

33 Claims, 9 Drawing Sheets

BIPOLAR MEMBRANES WITH FLUID DISTRIBUTION PASSAGES

This invention was made with government support under contract NAS9-19474 awarded by NASA. The government has certain rights in this invention.

FIELD OF THE INVENTION

The present invention relates to bipolar membranes and methods of making and using bipolar membranes.

BACKGROUND OF THE RELATED ART

The production of acids and bases from their salts may be achieved using an electrically driven process including a bipolar membrane and an aqueous medium. The process is represented by the equation:

$$\text{MX} + \text{H2O} \rightarrow \text{HX} + \text{MOH}$$
(salt) (water) (acid) (base)

To effect and maintain separation of the various species, ion exchange membranes are used. The most crucial of these membranes is the bipolar membrane, so called because it is composed of regions that are selective to ions of opposite charges. Under the influence of an applied direct current, such a sandwich membrane is capable of forcibly dissociating water to form equivalent amounts of hydrogen and hydroxyl ions. Used in conjunction with other cation-selective and anion-selective (i.e., monopolar) membranes, the assembly constitutes a water splitting apparatus that generates acid and base.

Figure 1:
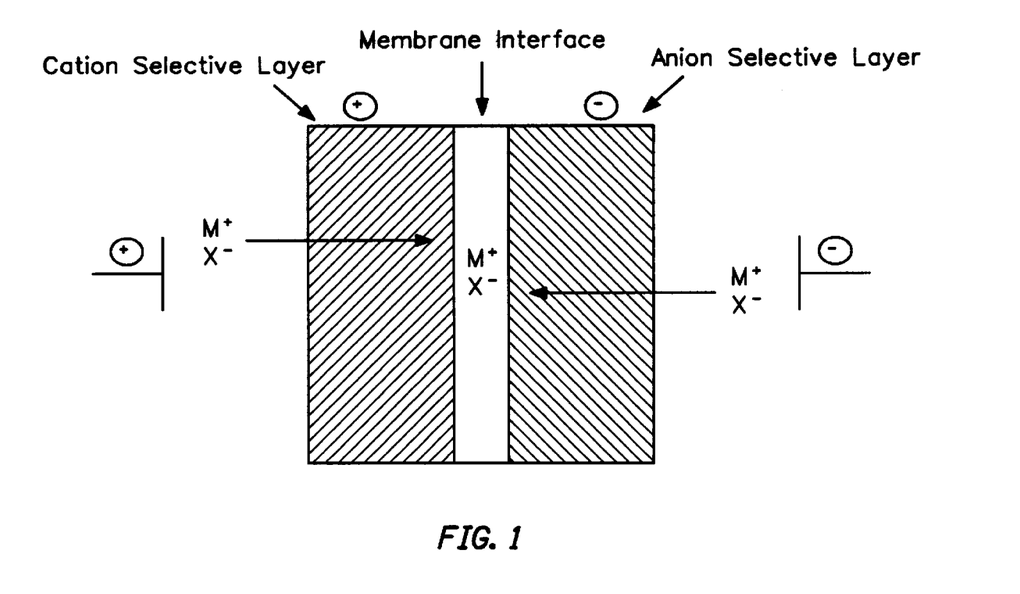
FIG. 1 is a cross-sectional side view of a bipolar membrane having a cation-selective layer facing the anode and an anion-selective layer facing the cathode.

The basic structure of bipolar membranes is shown in FIG. 1. Bipolar membranes include a cation selective layer, an anion selective layer and a thin interfacial region where the two ion exchange layers are in contact. The interfacial region may be either a plane or surface of contact or a layer itself, perhaps including adhesives or resin layers that help bring the cation and anion exchange layers into contact. In typical bipolar membranes, the cation selective layer, the anion selective layer and the interfacial region will be continuous and of essentially uniform thickness. The interfacial plane or layer is very important because it is where reactions, such as water or salt splitting reactions, take place under the influence of an applied electric field. However, before the reactions can take place, the species being split must move from outside the membrane through either the cation or anion exchange layers and into the interfacial region. Bipolar membranes of this or similar construction have been used as diaphragms in the electrolysis of water to hydrogen and oxygen or as separating membranes used in reclaiming acids and alkalis from aqueous solutions of salts.

Figure 2:
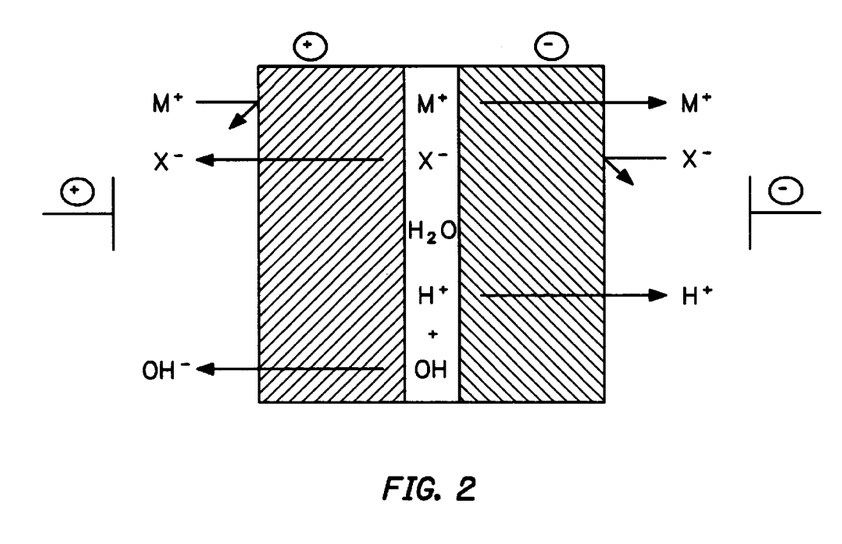
FIG. 2 is a cross-sectional side view of a bipolar membrane having a cation-selective layer facing the cathode and an anion-selective layer facing the anode for salt splitting or water splitting.

Bipolar membranes behave anisotropically under the influence of an electric field as is illustrated by the transport process shown in FIG. 1. When a current is passed across the bipolar A membrane with its cation selective side facing toward the anode and a salt solution disposed on either side of the bipolar membrane, cations and anions are transported to the interfacial region through the permselective membranes. However, the passage of ions out of the interfacial region is limited since the ions may not pass through regions of the bipolar membrane having the wrong selectivity. Consequently, salt builds up at the interfacial region and causes a low electrical resistance in the interfacial region. When the orientation of the membrane is reversed, as shown in FIG. 2 with the cation selective side facing toward the cathode, and current is passed, salt from the interfacial region is transported to the external solution leaving only $H^+$ and $OH^-$ ions from the dissociation of water to carry the current. With this orientation of the membrane, the electrical resistance of the interfacial region can become high since water has a low conductivity. Alternatively, bipolar membranes may be used in accordance with FIG. 2 to split water and salt. If the interfacial region is made very thin, the resistance of the interfacial region can be small and the membrane may be used to generate acid and base.

One of the most important parameters for the design of processes for electrodialysis of an acid and base is the electrical resistance exhibited by the membrane. Significant limitations are placed on the amount of current that can be applied across a bipolar membrane. For example, in water splitting, $H^+$ and $OH^-$ ions generated at the interface or interfacial region of the bipolar membrane require water for their formation. This water must diffuse to the interfacial region through either the cation selective layer or the anion selective layer. In addition, as the ions move to the base and acid compartments on either side of the bipolar membrane, the ions remove additional water from the membrane as water of hydration. As the current density is increased, the rate of water removal at the interface and throughout the membrane is increased. If the transport of water into the interfacial region, through either or both of the cation- and anion-selective layers from the adjacent solution, is not as rapid as the removal of water away from the interfacial region, by consumption and water of hydration, then some points of the interfacial region will dry out causing the water splitting process to slow down. Dry spots in the bipolar membrane will cause an even higher current density over that portion of the interfacial region that remains hydrated. Furthermore, the drying out of the interfacial region which results when the current density is too high can lead to irreversible damage to the membrane which manifests itself in still higher electrical resistance. This in turn increases the amount of energy required to drive the process.

One exemplary method for producing bipolar membranes discloses that a cation-exchange membrane and an anion-exchange membrane can be laminated using a mixture of polyethyleneimine and epichlorohydrin to bond the membranes to each other by curing (Japanese Patent Publication No. 32-3962). A second method discloses the bonding of a cation-exchange membrane to an anion-exchange membrane by using an adhesive having the properties of exchanging ions (Japanese Patent Publication No. 3403961). A third method discloses a pasty material comprising vinyl pyridine and an epoxy compound that is coated on the surface of a cation-exchange membrane, followed by exposure to radiation to obtain the bipolar membrane (Japanese Patent Publication No. 338-16633). A fourth method discloses a sulfonic acid polymeric electrolyte and an allylamine that are adhered to the surface of an anion-exchange membrane, followed by exposure to ionizing radiation (Japanese Patent Publication No. 51-4113). Yet another method discloses a process in which a polyethylene film is impregnated with styrene and divinylbenzene followed by polymerization to give a sheet-like material. The sheet-like material is then nipped between frames made of stainless steel, where one side thereof is sulfonated, and thereafter, the sheet is detached and the remaining side is chloromethylated followed by treatment for amination (U.S. Pat. No. 3,562,139). However, these bipolar membranes exhibit inherently poor current efficiency and high-power consumption. For example, the use of these bipolar membranes to split water requires application of a membrane potential (e.g. 2.5 V to 3.0 V, or higher) that is much higher than the theoretical water-splitting membrane potential (0.83 V).

Bipolar membranes have also been prepared by coating the mating surfaces of cation-and anion-exchange membranes with a solution comprising at least one kind of inorganic electrolyte, such as sodium tungstate, chromium nitrate, sodium metasilicate, and ruthenium trichloride. The mating surfaces are placed in contact and pressed to give a bipolar membrane having a low water-splitting membrane potential. This bipolar membrane, compared with the bipolar membranes discussed above, is characteristic of a low water-splitting membrane potential. However, the water-splitting potential of this membrane increases over a relatively short period of use due to the development of bubbles or blisters at the interface between the cation-exchange membrane and anion-exchange membrane. Partially or entirely separated membranes are rendered useless. Furthermore, this membrane still provides low current efficiency and is not satisfactory for use on an industrial scale.

Bipolar membranes which are used, for example, for isolating acids or bases from their salts by electrodialysis are ion exchange membranes having fixed cations on one side and corresponding anions on the other side. Bipolar membranes may be produced, for example, by firmly anchoring cationic or anionic groups to both sides of a neutral membrane by means of a chemical treatment (U.S. Pat. No. 4,0557,481) or bringing an anion-exchange membrane into close contact with a cation-exchange membrane, for example by pressing the membranes on top of one another in the presence of heat (British Pat. No. 1,038,777).

Attempts have been made to increase the stability of such bipolar membranes, obtained by combining anion-exchange membranes with cation-exchange membranes, by applying an ion-permeable adhesive between the two membranes. A polymerizable mixture of polyethyleneimine and epichlorohydrin (U.S. Pat. No. 2,829,095) or polyvinyl chloride and polyvinyl alcohol (Israel Journal of Chemistry, 9(1971),485) has been proposed as an adhesive. It has also been found that bipolar membranes suitable for electrodialysis may be obtained from an anion-exchange membrane, a cation-exchange membrane and an ion-permeable adhesive comprising of an aqueous solution of a polyvinylamine.

Bipolar membranes are difficult to produce by conventional methods. For example, in a chemical treatment of the surface, the two layers must have uniform thickness and must be in contact with one another over the entire surface area in order to ensure the current flow. On the other hand, the layers must not penetrate one another since the membrane would then lose its bipolar selectivity. Although combining two monopolar membranes gives bipolar membranes possessing defined anionic and cationic layers, this method gives rise to difficulties at the contact surface. If the membranes are not completely in contact, the resistance increases. The same applies where the adhesive is not sufficiently conductive. Moreover, very undesirable tears or bubbles may form at the points of contact in bipolar membranes of the stated type under typical operating conditions.

Bipolar membranes which consist of two individual membranes and polyvinyl alcohol as an adhesive may be prepared by a method in which the cation-exchange films and the anion-exchange films are coated with a polyvinyl alcohol solution. The cation-exchange and anion-exchange films are laid one on top of the other and heated for about one hour at about 60° C. The bipolar membrane is then dried and compressed for about 30 minutes at about 100° C. Although the resulting bipolar membranes exhibit firm adhesion, their swellability in aqueous salt solutions is irreversibly restricted, and these bipolar membranes, which possess rectifying properties, are therefore unsuitable for electrodialysis.

Despite certain advances described above, the performance of bipolar membranes is still limited by the transport of water into the interfacial region. U.S. Pat. No. 4,851,100 proposes to increase water transport to the interfacial region by using a continuous layer of a cation-selective material that is sufficiently thin to reduce the distance the water must diffuse to reach the interfacial region. This bipolar membrane is made by affixing a thin castable cation exchange membrane to a defined base anion exchange membrane. While a bipolar membrane of this construction might provide some increase in the rate of water transport to the interfacial region, the water transport rate is still limited because it has to pass through an ion-selective layer.

Therefore, there is a need for a bipolar membrane that provides for improved communication of fluids to the interfacial region between the cation-selective layer and the anion-selective layer. It would be desirable if the bipolar membrane provided direct communication of fluids to the interfacial region. It would be further desirable if the bipolar member were stable and exhibited low electrical resistance.

SUMMARY OF THE INVENTION

The present invention provides a bipolar membrane, comprising: an anion-selective region, a cation-selective region, an interfacial region between the anion-selective region and the cation-selective region, and means for delivering a fluid directly into the interfacial region.

The present invention also provides a bipolar membrane comprising a cation-selective region, an anion-selective region in contact with the cation-selective region, and a water distribution passage within the membrane. The contact between the cation-selective region and the anion-selective region defines an interfacial region. The water distribution passage may be formed in the interfacial region, the anion-selective region or the cation-selective region. Furthermore, the water distribution passage may be open and substantially unobstructed or the water distribution passage may comprise water-permeable material or a water wicking material.

Another aspect of the invention provides an apparatus comprising an anode, a cathode and a bipolar membrane having a cation-selective region, an anion-selective region contacting the cation-selective region and a water distribution passage within the membrane. The apparatus may be arranged so that the anion-selective region of the bipolar membrane faces in the direction of the anode and the cation-selective region of the bipolar membrane faces in the direction of the cathode. In one embodiment, a source of an electrolyte solution, such as a salt solution, is placed in fluid communication with the water distribution passage. The apparatus may comprise a plurality of bipolar membranes. In another embodiment, the apparatus may comprise a source of a salt solution in fluid communication with a first plurality of bipolar membranes and a source of water in fluid communication with a second plurality of bipolar membranes, wherein the first and second pluralities of bipolar membranes are disposed in an alternating sequence. Other embodiments may provide a cation-selective membrane disposed adjacent the anion-selective region of the bipolar membrane and/or an anion-selective membrane disposed adjacent the cation-selective region of the bipolar membrane. Alternatively, the cation-selective region of the bipolar membrane may face in the direction of the anode and the anion-selective region of the bipolar membrane face in the direction of the cathode.

Another aspect of the invention provides a method for producing a membrane with internal passages comprising the steps of hot pressing a cation conducting material and an anion conducting material around a plurality of removable elements at sufficient temperature and pressure to fuse the material into a single bipolar membrane and removing the elements from the membrane to leave a passage for fluids.

Yet another aspect of the invention provides an alternative method for forming a bipolar membrane with internal passages that comprises applying a thin recast film of a dilute solution of an anion conducting material onto a cation conducting material with tubes therein and allowing the recast film to dry. It may be desirable to apply multiple layers of the recast film with drying between each application. After the last application of recast film, the tubulated membrane is dried for several hours at room temperature, then baked in nitrogen at 100° C. for about one hour to cure the recast film so that it does not return to solution when exposed to water.

BRIEF DESCRIPTION OF THE DRAWINGS

So that the manner in which the above recited features and advantages of the present invention are attained can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention provides a bipolar membrane and methods for making and using the membrane. The bipolar membrane comprises a cation-selective region, an anion-selective region, an interfacial region between the anion-selective region and the cation-selective region, and means for delivering fluid directly into the interfacial region. The means for delivering fluid includes passages that may comprise a water-permeable material, a water-wicking material, an open passage disposed within the membrane or some combination thereof. The passages may be provided in many shapes, sizes and configurations, but preferably deliver fluid directly to the interfacial region so that the rate of electrodialysis is no longer limited by the diffusion of fluid through the cation- or anion-selective regions to the interfacial region. In many electrochemical systems, direct feed of required reactants to the membrane allows for a simpler system.

While the passage(s) may extend through any portion of the membrane, including entirely within the anion-selective region or entirely within the cation-selective region, it is-preferred that the passage walls provide fluid communication with both the anion-conducting and cation-conducting regions, most preferably by having the passage extend along the interface between the regions. In certain applications it may be desirable for the passages to be partially or completely offset toward either the anion-conducting and cation-conducting regions. For example, where the anion-selective membrane has a greater tendency to dry out, the passage may be offset to have greater contact with the anion-selective region in order to increase the degree of hydration.

In another aspect of the invention, a method is provided for forming a bipolar membrane, comprising the steps of providing a cation-selective member and an anion-selective member, disposing an adhesive and a plurality of elements between the members, and pressing the members together. The element may comprises a fluid-permeable material, a wicking material or a removable element, such as niobium wire and PTFE tubing, which leaves an open passage therein.

Yet another aspect of the invention provides an alternative method of forming a bipolar membrane comprising applying a thin recast film of a dilute solution of an anion (cation) conducting material onto a cation (anion) conducting material with tubes therein and allowing the recast film to dry. It may be desirable to apply multiple layers of the recast film with drying between each application. After the last application of recast film, the tubulated membrane is preferably dried for several hours at room temperature, then baked in the presence of nitrogen at 100° C. for about one hour to cure the recast film so that it does not return to solution when exposed to water.

In another aspect of the invention, a method is provided for producing a membrane with internal passages. The method comprises hot pressing a cation conducting material and an anion conducting material around a plurality of removable elements at sufficient temperature and pressure to fuse the material into a single bipolar membrane and removing the elements from the membrane to leave a passage for fluids.

A further aspect of the invention provides a membrane comprising a plurality of alternating cation-selective regions and anion-selective regions, each region disposed in contact with adjacent regions, and fluid distribution passages within at least two of the regions. In this manner, the fluid distribution passages may define compartments, analogous to those of conventional electrodialytic processes, that are contained within an integrated membrane. For example, the passage(s) between a first cation-selective region and a first anion-selective region may form a diluting compartment while the passage(s) between either a second cation-selective region and the first anion-selective region or a second anion-selective region and the first cation-selective region may form a concentrating compartment. It should be recognized that the fluid distribution passages may operate in either a fluid delivery mode or a fluid collection or removal mode. Other arrangements and processes will become apparent those in the art given the disclosure herein.

Additionally, the fluid distribution passages of the present bipolar membranes may comprise open channels, elements (such as fluid absorbent strands or wicks), networks of channels or elements, or combinations thereof.

Membranes having internal fluid passages in accordance with the present invention can be formed in number of ways. One preferred method of making tubulated membranes uses an apparatus comprising a pair of upper tensioning rods in a spaced relation having top surfaces lying in a common plane and a pair of lower tensioning rods separated by the upper tensioning rods having top surfaces lying in or below the common plane of the upper tensioning rods. The upper and lower tensioning rods are coupled to a securing member, such as by bolting both ends of each rod to a pair of opposing, rigid members. One or more removable elements are disposed over the pair of upper tensioning rods and around one of the lower tensioning rods to define the size and spacing of the passages. It is preferred that only one removable element be used, such as a long PTFE fiber, and that the element be wound around the rods a multiple number of times.

The bipolar membranes of the present invention may be produced using conventional ion exchange membranes. For example, bipolar membranes may be produced by copolymerization of styrene and divinylbenzene or butadiene, or the copolymerization of acrylonitrile and butadiene, wherein the cations are firmly attached to the membrane by, for example, sulfochlorination, and the anions are firmly attached to the membrane by chloromethylation and reaction with tertiary amines. The thickness of the bipolar membranes is preferably between about 0.1 and about 1 mm thick. Furthermore, the bipolar membranes may optionally include a reinforcing material of various kinds and forms depending on the method in which cation-exchange membranes are prepared.

The bipolar membrane of the present invention may be made with any conventional cation-exchange membrane, including membranes having an ion-exchange group such as a sulfonic acid group or a carboxylic acid group. The cation-selective region can be made from a material selected from partially or fully fluoronated polymers having carboxylic or sulfonic acid functional groups, copolymers of ethylene with acrylic acid, copolymers of ethylene with methacrylic acid, styrene polymers having carboxylic acid functional groups or sulfonic acid functional groups, divinylbenzene polymers having carbexylic acid functional groups or sulfonic acid functional groups, derivatives thereof and mixtures thereof. The most preferred cation-exchange membranes include a sulfonic acid group that retains an exchange group even under an acidic condition. Furthermore, because the cation-exchange membrane is not required to have any particular capacity, most conventional membranes are suitable. The cation-exchange membrane will preferably have a capacity between about 0.5 and about 3 milli-equivalents per gram (meq/g), most preferably between about 1 and about 2.5 meq/g. The cation-exchange membrane may be a polymerized type, a homogeneous type or a nonhomogeneous type. Furthermore, the cation-exchange membrane may include a small amount of an anion-exchange group so long as they have cation transport numbers of not less than about 0.9.

The anion exchange layer may be made with any conventional anion exchange material having ion-exchange groups such as positively charged organic ions, amino or quaternary ammonium groups. The anion-selective region can be made from a material selected from polymers having partially or fully fluoronated primary chains (backbones), saturated hydrocarbon primary chains, partially unsaturated primary chains, aromatic or partially aromatic primary chains, or saturated primary chains containing hetero atoms with functional groups selected from positively charged functionalities, amino groups, amine groups, and derivatives thereof. The polymeric membrane structure would contain the anion-exchange group locked in the organic network. The polymer can be a copolymer of vinylpyridine, divinylbenzene with monomers styrene, ethylene, methacrylic acid or propylene copolymerized in various amounts. The anion exchange membrane can have a reinforcing matrix, which may include polyethylene, polypropylene, polyvinylchloride and polyvinyl acetate. The anion-exchange membrane will preferably have a capacity between about 1 and about 3 milli-equivalents per gram (meq/g). The anion exchange membrane may be a polymerizable type, a homogeneous type or a non-homogeneous type.

In accordance with the invention, the ion exchange membranes are preferably secured together using an adhesive, such as an "ionic adhesive" made up of positively and negatively charged ion conducting species. These adhesives include, but are not limited to, epichlorohydrin, polyethylenimine, polyacrylic acid, polyvinylamine, poly (4-vinyl) pyridine, powdered commercial anion and cation exchange resin, and combinations thereof. After applying the ionic glue, the cation conducting material and the anion conducting material are preferably hot pressed around a plurality of removable elements at sufficient temperature and pressure to bond the material into a bipolar membrane. The removable elements may be removed by extraction or dissolution leaving a passage for fluids. A preferred adhesive is an aqueous solution containing a mixture of polyacrylic acid and polyethylenimine, most preferably in a polyethylenimine:polyacrylic acid ratio of about 6:1.

Alternatively, the adhesive may include a polyvinylamine in which the amino group is substituted with an alkyl group having from 1 to 4 carbon atoms and the polyvinylamine has a molecular weight between about $10^4$ and about $10^6$. The concentration of the aqueous polyvinylamine solution may be between about 0.5 and about 70 percent by weight, but the preferred concentration is between about 3 and about 15 percent by weight. Solutions of the aqueous polyvinylamine may be obtained, for example, by a conventional method of acidic or alkaline hydrolysis of polyvinylformamide or of polyvinylacetamide with sodium hydroxide solution or hydrochloric acid. A preferred method of forming an aqueous polyvinylamine solution includes hydrolyzing aqueous polyvinylformamide with hydrochloric acid at a temperature between about 60° C. and about 100° C. The aqueous polyvinyl formamide concentration is preferably between about 1 and about 50 percent by weight, most preferably between about 5 and about 20 percent by weight. The resulting polyvinylamine solutions are still liquid and can be easily applied onto the membranes.

The adhesive solutions may be applied using any conventional technique, including brushing or roller-coating onto one or both of the ion exchange membranes. The solution is preferably applied at a temperature between about 10° C. and about 50° C. It is also possible to impregnate the membranes on both sides with the solution. However, the outer membrane surface is preferably washed free of the adhesive during finishing of the bipolar membrane. The thickness of the adhesive layer is preferably between about 0.001 and about 0.05 mm.

In the bipolar membrane of the present invention, the cation-exchange membrane may be bonded to the anion-exchange membrane by any method. However, it is preferred that the cation-exchange membrane and the anion-exchange membrane be adhered closely to each other at a peel strength of not less than 0.2 kg·f/25 mm in a wet state to prevent separation of both the membranes when the bipolar membrane is used in a wet state, such as in water splitting. A bipolar membrane with a low peel strength will allow bubbles or blisters to form at the interface between the anion-conducting membrane and the cation-conducting membrane during use. Bubbles and blisters cause a reduction in current efficiency per unit membrane surface area and a gradual increase, over long periods of use, in membrane potential. Such membranes must be periodically replaced.

Figure 3:
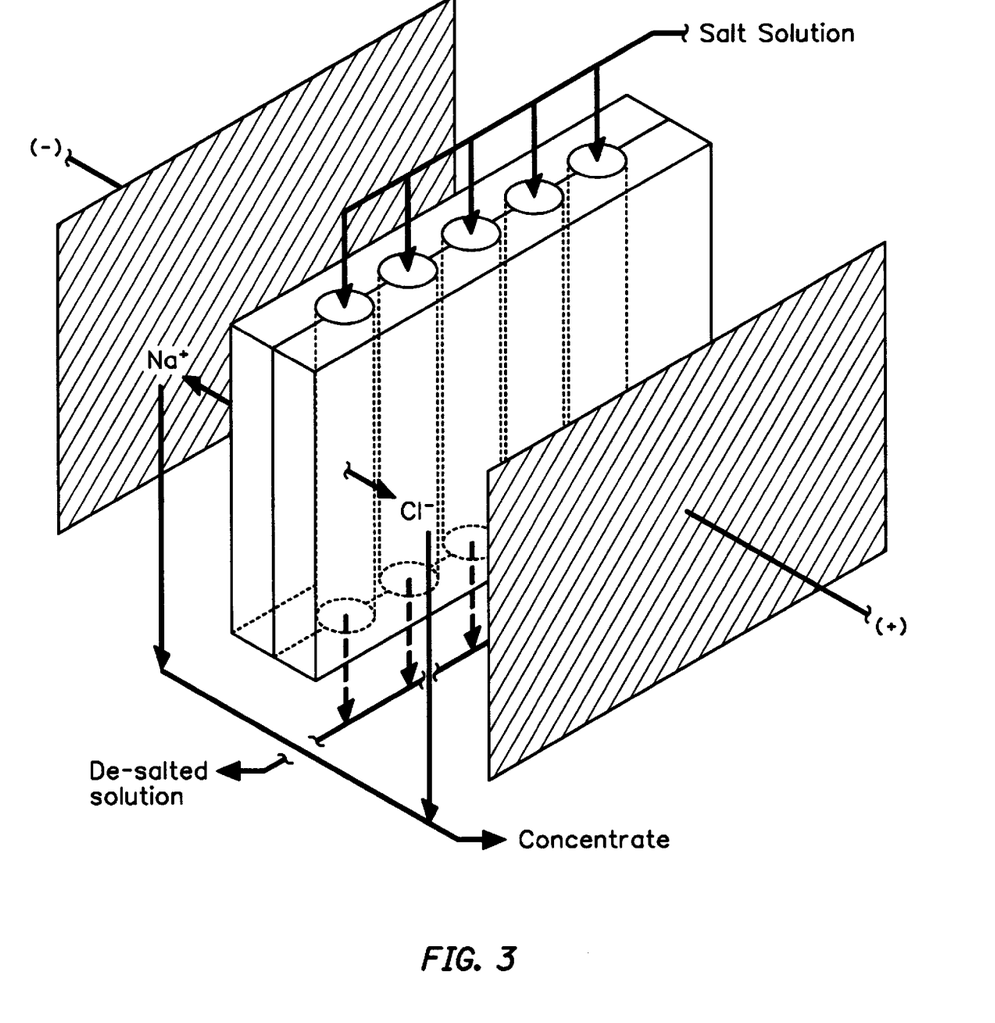
FIG. 3 is a schematic perspective view of a bipolar membrane having fluid distribution passages in accordance with the present invention, where the membrane is being used in a water desalination cell.

FIG. 3 is a schematic perspective view of a tubulated bipolar membrane being used in a water desalination cell. The bipolar membrane separating the anode and cathode serves the dual purposes of conducting cations to the cathode and anions to the anode. The bipolar membrane of the present invention provides passages having a cross-sectional dimension between about 2 and about 9 mils (between about 0.002 inches [about 51 $\mu$m] and about 0.009 inches [about 229 $\mu$m]) within the bipolar membrane. In this manner, water can be provided to the open ends of the passages along one edge of the membrane and delivered throughout the membrane by capillary action. The water may even be circulated through the passages and exit the membrane at the open ends.

The tubulated bipolar membrane can be formed in a variety of ways. Briefly, the technique involves pressing anion and cation conducting materials around a plurality of removable elements at sufficient temperature and pressure to fuse the material into a single membrane. After the material is fused the elements are removed from the membrane to leave a passage for fluid. The removable elements may take any shape or form so long as the passage provide a substantially uniform flow of fluid throughout the entire membrane. The preferred removable elements are substantially parallel wires or tubes. However, it may be possible to form the passages around elements which are later removed through dissolution.

Figure 4A:
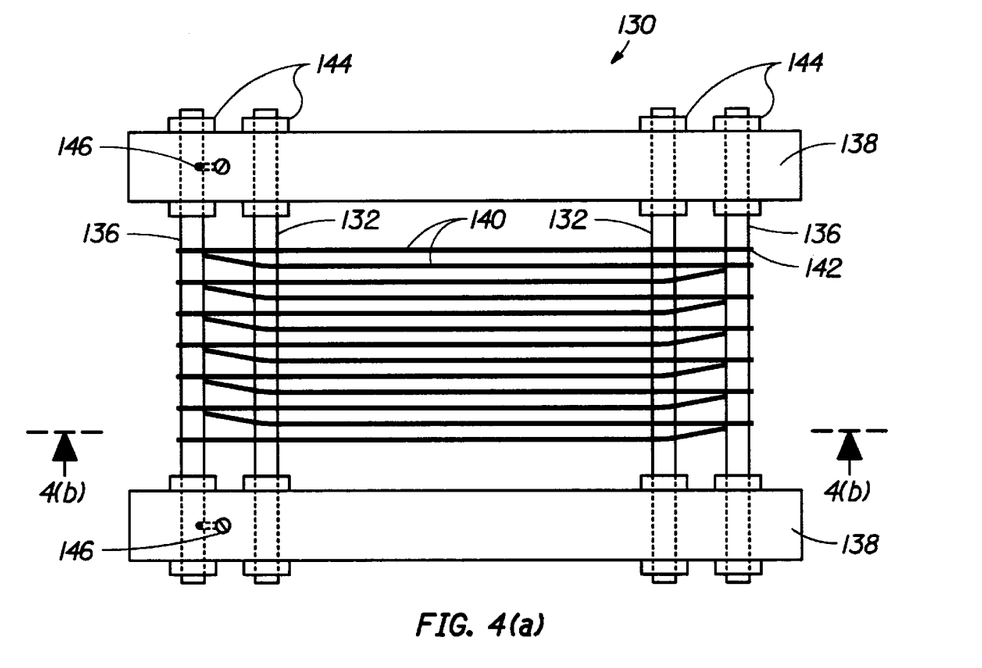
FIGS. 4(a) and 4(b) are schematic top and cross-sectional views of a tensioning frame, respectively.
Figure 4B:
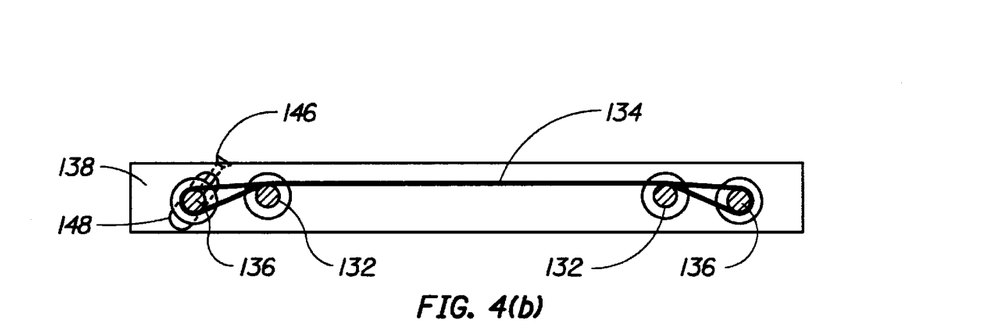

FIGS. 4(a) and 4(b) are schematic top and cross-sectional views of a tensioning frame 130 that is designed for holding a series removable elements tight and parallel during formation of a membrane with internal passages. This tensioning frame 130 has a pair of upper tensioning rods 132 having top surfaces lying in a common plane (shown best in FIG. 4(b) at line 134). The upper tensioning rods 132 are a sufficient distance apart to form a membrane therebetween, typically from about 3 to about 5 inches. A pair of lower tensioning rods 136 are separated by the upper tensioning rods 132 having top surfaces lying in or below the common plane of the upper tensioning rods 132. These two sets of tensioning rods are firmly held in position by two substantially parallel sidebars 138.

One end of a long removable element 140, such as string, wire or tubing, is tied to a lower tensioning rod 136, say at point 142. The string is then passed over the top of both upper tensioning rods 132 and around the other lower tensioning rod 136. The string is threaded back and forth in this fashion, positioning the wire in a spaced arrangement, until the wire covers a planar area the size of the desired membrane, typically between a 3 inch by 3 inch square and a 5 inch by 5 inch square. However, the completed bipolar membrane may be formed or cut into any shape. Once the membrane has been formed, the membrane can be removed from the frame either by cutting the tubing and/or wires along both ends near the upper or lower tensioning rods, 132 or 136 respectively, or by disconnecting the rods 132 and 136 respectively, or by disconnecting the rods 132 and 136 from one sidebar 138 by removing bolts 144.

The apparatus may also include means for adjusting the tension on the wire that is threaded over the tensioning frame. The tension is adjusted by moving (1) an upper tensioning rod upward or outward, and/or (2) a lower tensioning rod downward or outward. Typically, the rods are moved and the elements tightened by turning a set screw 146 in the sidebar 138 which puts an angular force on the rod. It is preferred that the tensioning frame have only one adjustable rod and that the sidebars have a narrow slot 148 through which the rod can travel as the screw 146 is tightened.

A bipolar membrane is formed by placing an anion-exchange membrane and a cation-exchange membrane on either side of the elements and hot pressing. The membrane is hot pressed by placing a block, preferably a metal such as aluminum, small enough to fit in the space inside the frame on the lower platen of the press (not shown) and topping it with a load leveling pad, preferably silicone rubber, and a release sheet, preferably a PTFE finished cloth. A first membrane is placed on the release sheet. Next, the filled tensioning frame is placed with the removable elements directly over the first membrane. A second membrane is then placed on top of the filled frame. This arrangement is topped with a second release sheet, a second leveling pad, and a second block. The press is then closed and the press cycle carried out.

If it is desirable to form a membrane and electrode assembly, it is possible to combine the formation of the internal passages and the hot pressing of membrane and electrode assembly into a single press step. The press package is assembled in a manner analogous to that described for the pressing of membranes, except that the electrodes are positioned on either side of the membrane materials. The press conditions are determined by the configuration of membrane material, as set out above. For example, when hot pressing a membrane and electrode assembly having anion and cation membranes above and below PTFE tubes, the preferred press conditions are a pressure of about 400 psi at a temperature of about 200° C. for about one minute. One further optional component which can be added to the press package for hot pressing is a PTFE gasket positioned around the perimeter of the assembly. This complex assembly is then ready for installation in an electrolytic cell.

The bipolar membranes of the present invention are useful in many electrodialysis methods and apparatus, wherein fluid is introduced directly into the interfacial region or zone of the membrane as shown in FIGS. 5 through 11. Electrodialysis apparatus in accordance with the present invention may comprise a single cell unit or a plurality of cell units, frequently referred to as a "stack", and each cell may comprise multiple compartments. In the most general case, a three compartment unit cell can be used.

Figure 7:
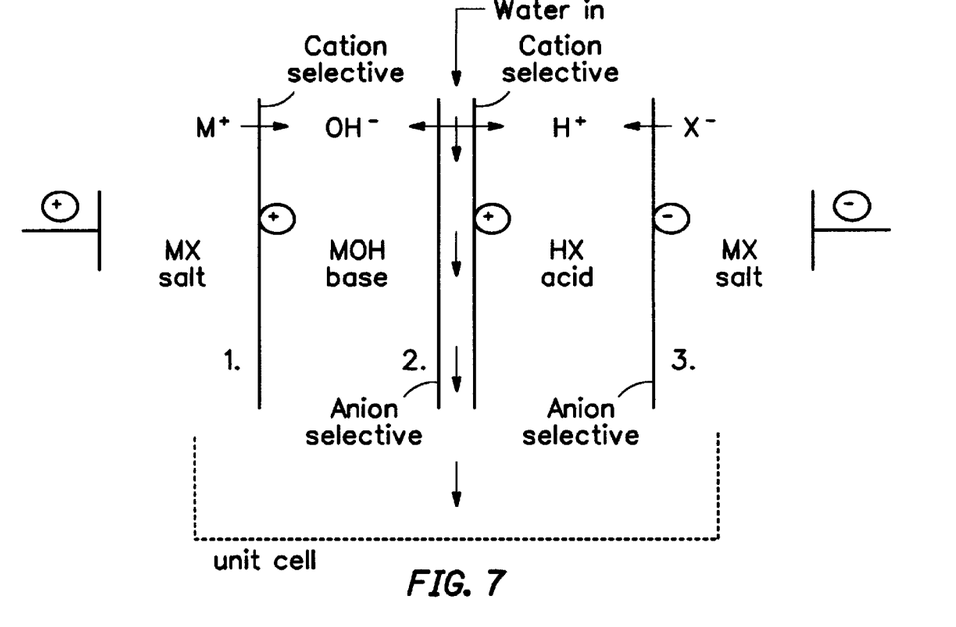
FIG. 7 is a schematic diagram of an electrodialysis apparatus for water splitting and acid/base generation.

FIG. 7 is a schematic diagram of an electrodialysis apparatus for water splitting and acid/base generation having a cation-selective membrane, a bipolar membrane and an anion-selective membrane. These membranes define compartments there between and maintain separation of fluids within those compartments, such as the acid, base and salt solutions shown. The three compartments and three membranes constitute a cell unit. A large number of cell units, frequently between about 30 and about 200 of such cell units or cells, may be assembled to form an electrodialysis stack. Typically, such a stack will have only a single set of electrodes disposed at each end of the stack or single cell unit.

If a salt solution is introduced into salt compartments on the anode side of a cation-selective membrane and on the cathode side of an anion-selective membrane and an electrical potential is established between the anode and cathode, then cations in the salt solution will migrate towards the anode and anions in the salt solution will migrate towards the cathode. The cations will permeate the cation-exchange membrane into the base compartment and form a base with the hydroxide ions formed within the first bipolar membrane and transported towards the anode. On the other side of the bipolar membrane, which is directed towards the cathode, the protons, which are formed simultaneously with the hydroxide ions, are collected. The protons form an acid in the acid compartment with the anions migrating from the salt solution through the anion-exchange membrane towards the anode.

The principle of electroneutrality does not permit H+ and OH– product ions to exist outside the bipolar membrane without counter ions to balance the charges. Electroneutrality is satisfied by assembling bipolar membranes in positions between alternating monopolar anion and cation membranes. Electroneutrality is maintained within the anion-selective and cation-selective layers by immobilized ionic charges within the layers.

A manifold or conduit may be disposed external to the cell or within the diaphragms or support structure of the cell in order to deliver fluid to the fluid passages within the bipolar membranes and the compartments making up the cells. Fluid flow to any member of the cell may be continuous or discontinuous. Furthermore, fluid may be made to enter and leave the bipolar membranes by separate conduits or the same conduits.

Fluid may also be introduced in a "dead end" arrangement, as well as a "pass through" arrangement. In many instances, water will be introduced into the bipolar membrane in order to bring bout a water-splitting reaction. In accordance with the invention, it is preferred that water be supplied through a passage directly to the interfacial region of the bipolar membrane independent of water diffusing to the interfacial region from the outside surfaces of the membrane. The water delivered to the passage does not have to be pure, but may contain dissolved substances, such as inorganic or organic salts.

Figure 8:
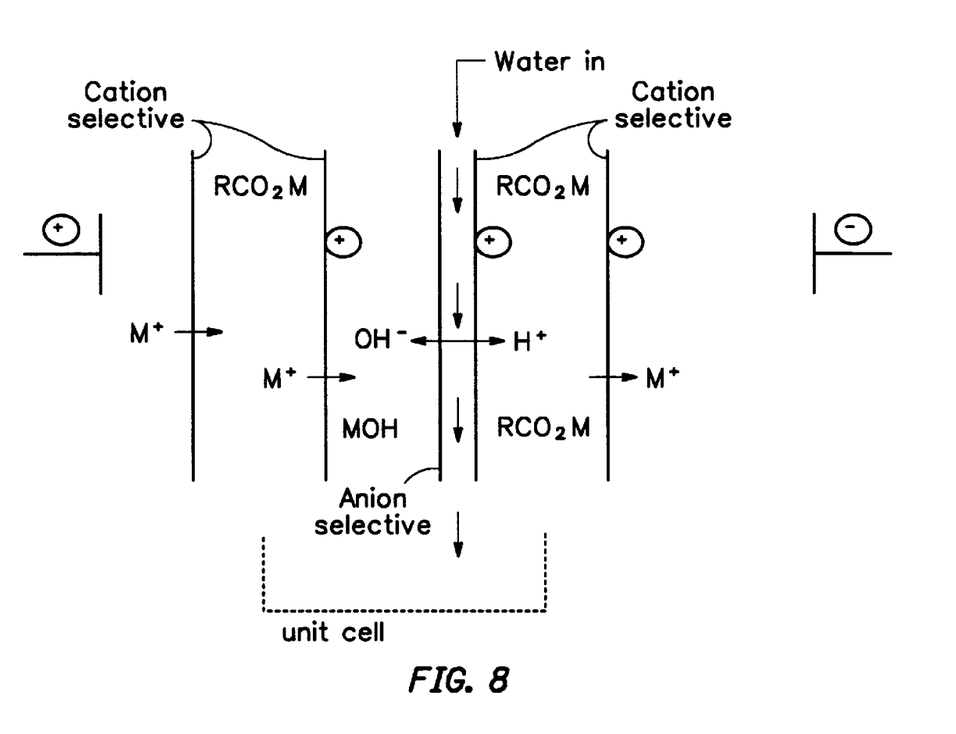
FIG. 8 is a schematic diagram of a two compartment electrodialysis apparatus for water splitting and acid/base generation.
Figure 9:
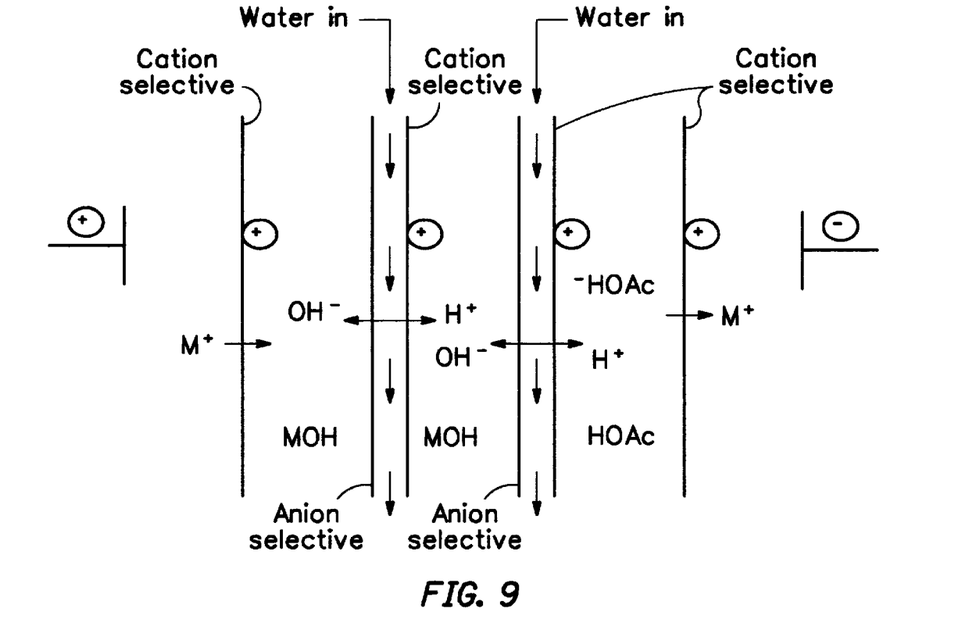
FIG. 9 is a schematic diagram of a double bipolar cell.

The bipolar membranes of the present invention may be used to advantage in any known cell arrangements or configurations that use bipolar membranes. FIG. 8 is a schematic diagram of a two compartment electrodialysis apparatus for water splitting and acid/base generation. Salts of acids like formic acid, acetic acid or lactic acid can be converted into their acids and corresponding amounts of base in a stack with only bipolar and cation exchange membranes. Conversely, FIG. 9 shows a three compartment cell in which two bipolar membranes are used. It should be understood that there are many types of electrochemical cells that can use bipolar membranes with internal passages, and the arrangements shown in FIGS. 5 through 11 are merely examples.

Figure 10:
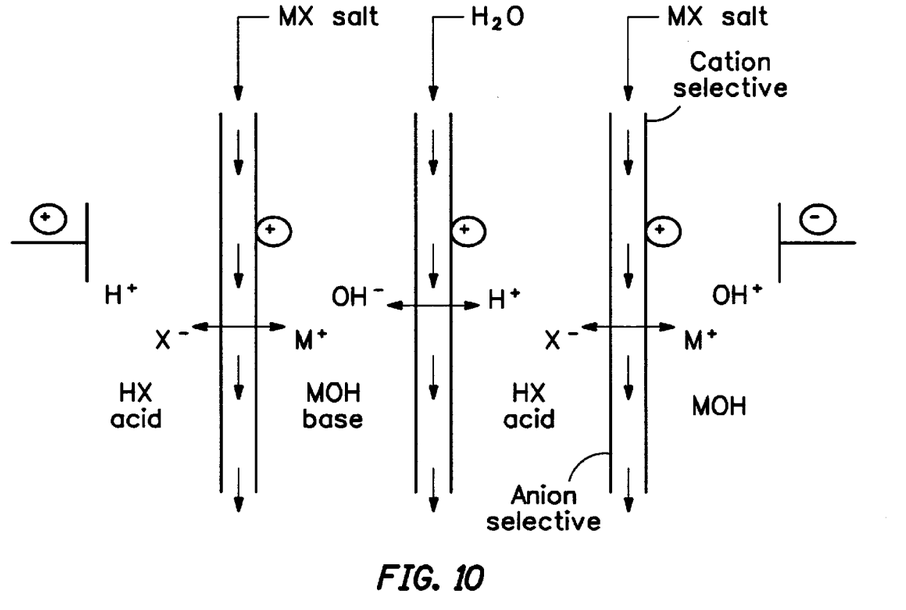
FIG. 10 is a schematic diagram of an acid/base generation system utilizing bipolar membranes with fluid distribution passages, wherein alternating passages are in fluid communication with a salt solution and water.

The present invention also includes an apparatus in which only the bipolar membranes of the present invention are used for acid-base generation. FIG. 10 is a schematic diagram of an acid/base generation system utilizing only bipolar membranes with fluid distribution passages along the interfacial region, wherein alternating passages are in fluid communication with a salt solution and water.

Figure 5:
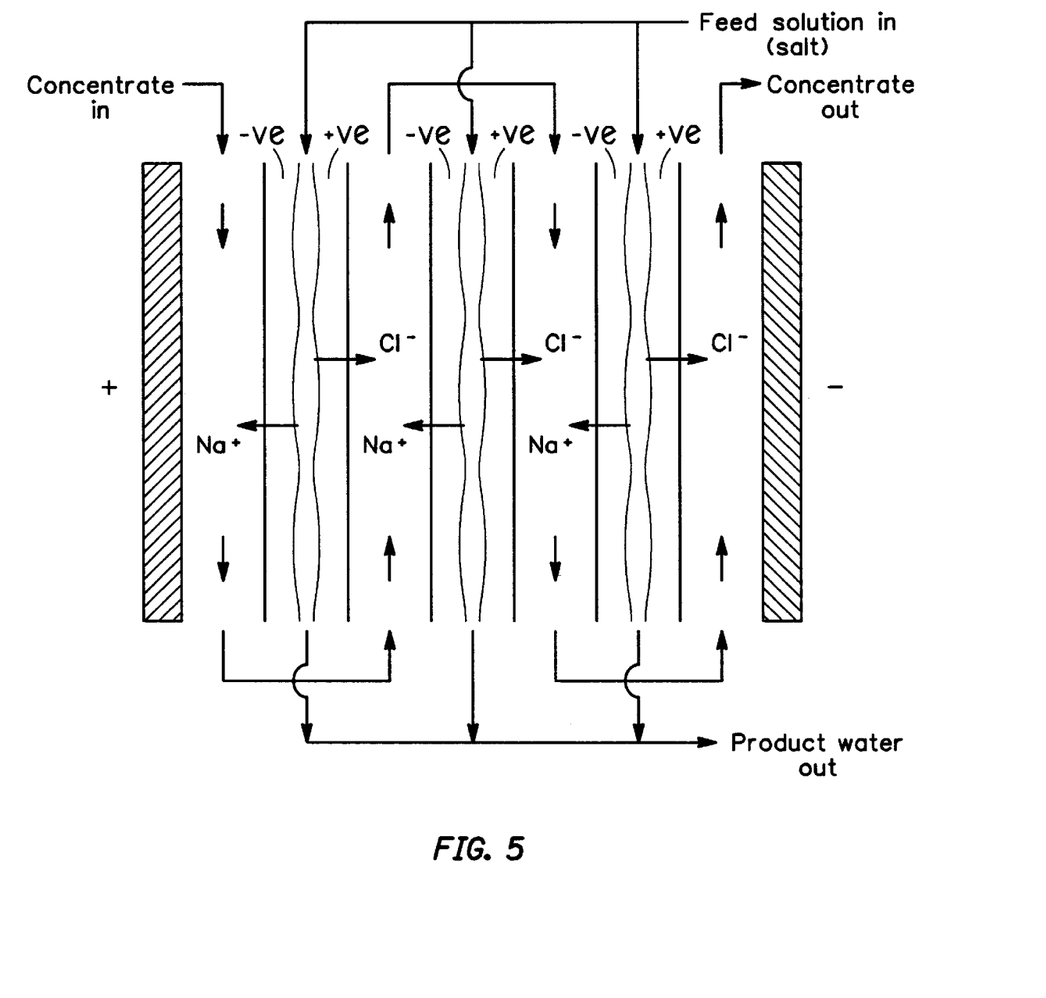
FIG. 5 is a schematic diagram of a stack of the water desalination cells of FIG. 3.

FIG. 5 is a schematic diagram of a stack of the water desalination cells of FIG. 3. The salt is removed from the feed solution passing through the bipolar membranes and concentrated in the liquid passing on either side thereof. The chloride anions from the anion exchange side of a first bipolar membrane are recombined with the sodium cations from the cation exchange side of a second bipolar membrane. It is preferred that the concentrate solution be provided in a serpentine path between a plurality of the bipolar membranes to produce a single salt concentrate solution.

The bipolar membranes of the present invention provide a unique apparatus for the purification of liquids by reducing the concentration of ions or molecules in the liquid. Known techniques for purifying and isolating liquids or to obtain concentrated pools of specific ions or molecules from a liquid mixture include liquid chromatography, membrane filtration, reverse osmosis, ion exchange and electrodeionization and electrodialysis.

In conventional electrodialysis processes in which the cell units are composed of anion and cation membranes that are completely separated by a series of fluid concentrating and diluting compartments filled with solution. A large number of such cell units can be assembled to form an electrodialysis stack. Direct current input to the stack is made via electrodes at the ends of the cell. During the process, the diluting compartments contain feed water that is being purified gradually by desalting (decreases in ionic content) while the concentrating compartments become enriched. This gradual decrease of conductivity in the diluting compartments is the decisive factor for end-product purity. Theoretically, current could pass through water until all electrolytes (ionic components) have been removed. However, the amount of power required to continue this process beyond a given electrolyte level would be phenomenal. In practice, purification by electrodialysis is terminated when the Total Dissolved Solids (TDS) of the treated water is equivalent to about 500 ppm as sodium chloride. Thus, conventional electrodialysis processes are unable to produce highly deionized solutions from already dilute electrolyte solutions.

Figure 11:
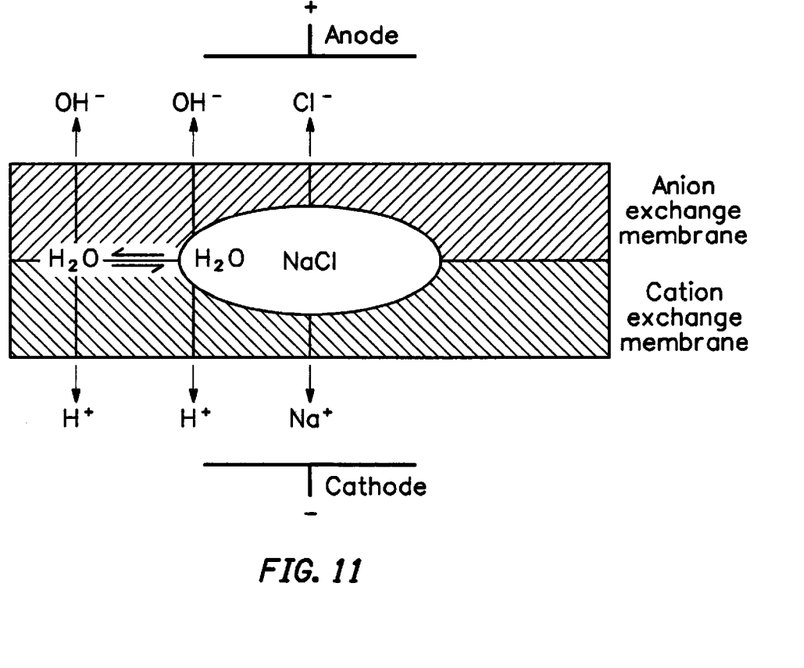
FIG. 11 is a schematic diagram of a bipolar membrane illustrating the ability to produce a highly deionized solution.

However, when the bipolar membranes of the present invention are disposed between electrodes with the anion-selective region facing the direction of the anode and the cation-selective region facing the direction of the cathode, a highly deionized solution may be produced without the use of ion exchange resins within the cell. FIG. 11 is a schematic diagram of a bipolar membrane illustrating the ability to produce a highly deionized solution. A contaminated feed stream is introduced into the passages of the bipolar membrane and an electric potential is applied across the cell. Because of the semipermeability properties of the membranes and the directionality of the electrical potential gradient, negatively charged ions migrate towards the anode (positive electrode) and positively charged ions migrate towards the cathode (negative electrode). This causes the ions in the passages (i.e., diluting channels) to become depleted. These ions will become concentrated in the adjacent concentrating compartments. The anodic and cathodic reactions are given in equations 1 and 2.

Anode:$2H_2O \rightarrow O_2 + 4H^+ + 4e^-$      Equation(1)

Cathode:$2H_2O + 2e^- \rightarrow 2OH^- + H_2$      Equation(2)

At the anode, hydrogen ions are liberated, decreasing the pH and creating acidic conditions. The anions pass through the anion-selective region, migrate to the anode and combine with the $H^+$ ions to form an acid solution. At the cathode, hydroxyl ions are produced under an applied potential. The cations pass through the cation-exchange membrane and migrate to the cathode and combine with the $OH^-$ ions to form a basic solution. Thus, the movement of counter ions across the polymer maintains charge neutrality in all compartments. The passage of about 96,494 Coulombs (one Faraday) causes the transfer of one chemical equivalent (mole) of salt. When the two solution from the concentrating compartments are combined, brine is formed.

The selective permeability of ion-selective or ion-exchange membranes is important to this process. To maintain electrical neutrality, each of these fixed charges must be associated with an opposite charge. In the case of a cation-selective membrane, negative charges are fixed to the membrane and are associated with a positive counter ion, such as $Na^+$. Therefore, cations (the counter ion) move very easily from fixed negative group to fixed negative group, provided there is another cation waiting to replace them. The fixed, electronegatively charged particles on the cation membrane matrix repel anions, so they cannot enter to any significant extent. In the case of a cation exchange membrane, negative charges are fixed to the membrane and are associated with a positive counter ion such as $Na^+$. Ion-exchange membranes are electrically conductive because of their ability to exchange counter ions.

Ion exchange membranes are usually impermeable to water and therefore can function as a barrier to bulk flow while allowing transfer of counter ions under the influence of an electrical potential. In practice, ion-exchange membranes are not completely efficient and a small percentage of co-ion permeability does occur, as does a small percentage of water transfer (by osmosis and/or transfer of hydrated ions).

As discussed above, conventional electrodialysis processes are not efficient in producing highly deionized fluids because electrochemical techniques operate only on process streams that have a relatively high dissolved ion content to carry out charge transfer between the electrodes. In other words, they only work on solution with a high electrolyte content. However, the bipolar membranes of the present invention provide a continuous ionically conducting pathway for ion transfer and also serves as a conductivity bridge between the cation-selective and anion-selective regions for the movement of ions. FIG. 11 illustrates how the passage allows the feed solution to come into direct contact with both ion exchange regions allowing a high surface area for ion transfer. In FIG. 11, the bipolar membrane is being used for desalting a water stream. The bipolar membranes are useful in splitting all inorganic and organic salts and mixtures thereof.

As the reaction occurs, the fluid in the diluting channels (the bipolar membrane passages) to become deionized. However, dissociation of water into $OH^-$ and $H^+$ (water splitting) occurs at the membrane interface when a current is applied. Therefore, even though the solution being processed through the passages of the bipolar membrane may be a poor ionic conductor (i.e., a dilute electrolyte), the water splitting reaction combined with the efficient transfer of $H^+$ and $OH^-$ ions by the fixed ion exchange sites, ensures high transmembrane ionic conductivity. The electrochemical cell's ion conducting circuit is completed by the concentrating compartments, the space between the membrane and the electrodes. If necessary, the conductivity of these concentrating compartments can be enhanced by being filled with ion exchange resins. The arrangement shown in FIG. 11 permits high currents to be applied across the cell at low voltages. The bipolar membrane with fluid distribution passages aids water dissociation as fluids can readily diffuse from the tubes across the entire area of the membrane interfacial region. The water dissociation process can occur without reliance on slow transport of water to the membrane's interface from the external surfaces of the membrane.

The bonded ion-selective membranes create a permanent and continuous ionic medium between the electrodes that permits the process to operate efficiently over a wide range of electrolyte concentrations or even when there is no electrolyte. This process allow feed water to be purified to levels of less than1 ppm sodium chloride with no increase in electricity consumption.

Figure 6A:
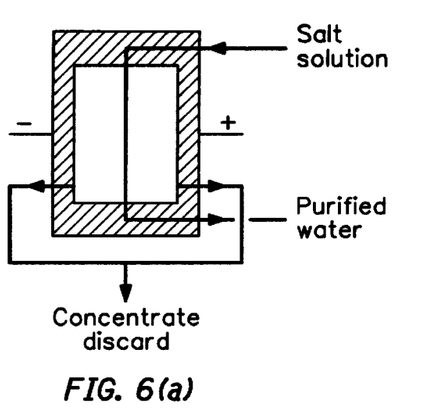
FIG. 6(a) is a water desalination unit where the ions are collected as a concentrated liquid.

FIG. 6(a) is a water desalination unit where the ions are collected as a concentrated liquid. The salt is removed from the feed solution by introducing the feed stream through the passages of the bipolar membrane. When a voltage is applied, the anion exchange membrane allows transfer of anions and the cation exchange membrane allows transfer of cations. A liquid stream circulates around the anion and cation exchange membrane and collects the ions. The cell manifolding and fluid conduits are arranged in such a manner that anions and the cations from the concentration compartments are combined to produce a single salt (brine) concentrate solution.

Figure 6B:
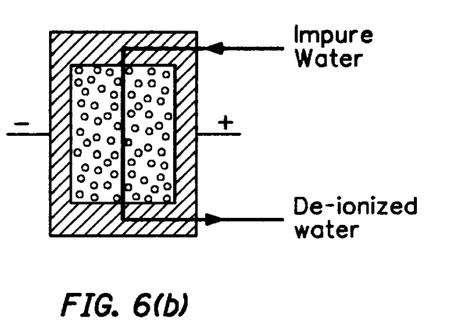
FIG. 6(b) is a deionization unit where the ions removed from the feed solution are collected on ion exchange resin beds within the concentrating compartments.

In some processes it may be desirable to combine the apparatus with ion exchange resins or particles. FIG. 6(b) is a deionization unit where the ions removed from the feed solution are collected on ion exchange resin beds packed within the concentrating compartments. The space between the anode and the bipolar membrane is packed with anion-exchange resin beads and the space between the cation-exchange membrane and the cathode is packed with cation exchange resin beads. The ion-exchange resin beads serve a dual role as an absorption bed for separated ions and as an immobile electrolyte, i.e., it provides the necessary conductivity in the region between the bipolar membrane and the electrodes for operation of the process at low cell voltages. It should be noted that in this configuration, the diluting compartment is free of any ion exchange resin material.

Figure 6C:
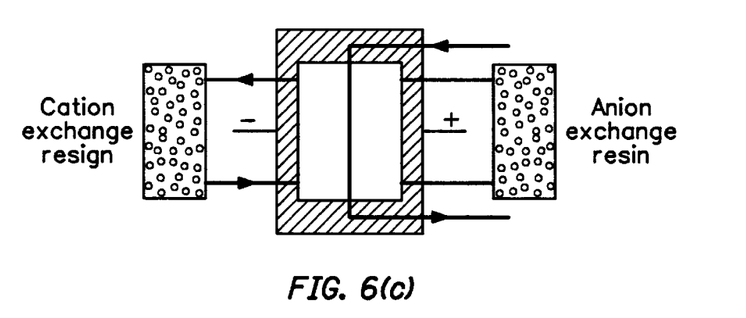
FIG. 6(c) is a deionization unit where the ions removed from the feed solution are collected on ion exchange resin beds outside the unit.

FIG. 6(c) is a deionization unit where the ions removed from the feed solution are collected on ion exchange resin beds outside the unit. Fluids from the concentrating compartments are fed to external ion exchange beds connected to the anodic and cathodic fluid concentration compartments. Anions from the anion exchange membrane collect on the anion exchange bed. This stream can contact the resin bed in a single pass or by recirculation. Similarly, cations from the cation side of the bipolar membrane collect on the cation exchange resin bed. Locating the ion exchange beds external to the cell has a number of advantages over placing it within the electrochemical cell. It reduces the cell size and decreases the electrical resistance that results when there is a large space occupied by the resin between the electrodes and membrane. There may be a configuration where the fluid from the concentration compartments contain both dissolved anions and cations. In this embodiment, a mixed resin bed (combined anion and cation exchange resins) may be used.

Figure 6D:
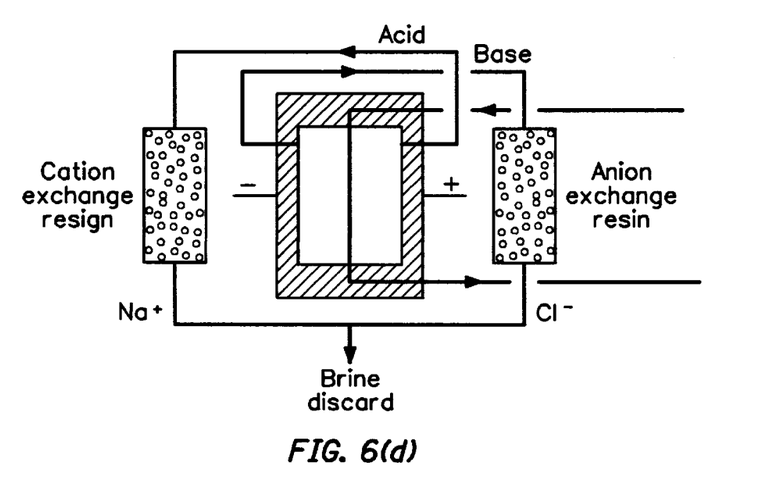
FIG. 6(d) is an arrangement showing how the ion exchange beds of FIG. 6(c) may be regenerated.

The arrangement in FIG. 6(d) shows how the ion exchange beds of FIG. 6(c) may be regenerated. Under an applied voltage, hydrogen ions are produced at the anode resulting in acidic conditions and hydroxyl ions are produced at the cathode resulting in basic conditions. The compartment immediately adjacent to the anode is connected to the cation exchange resin bed so that the fluid causes the regeneration of the bed by stripping the cations from the cation exchange bed. The basic concentrate stream from the compartment immediately adjacent the cathode is connected to the anion exchange resin bed to regenerate the resin by stripping the anions from the bed. Both streams are collected as a single salt concentrate solution. The fluid flow can be reconfigured using valves and switches to return to the configuration shown in FIG. 6(c).

Figure 12:
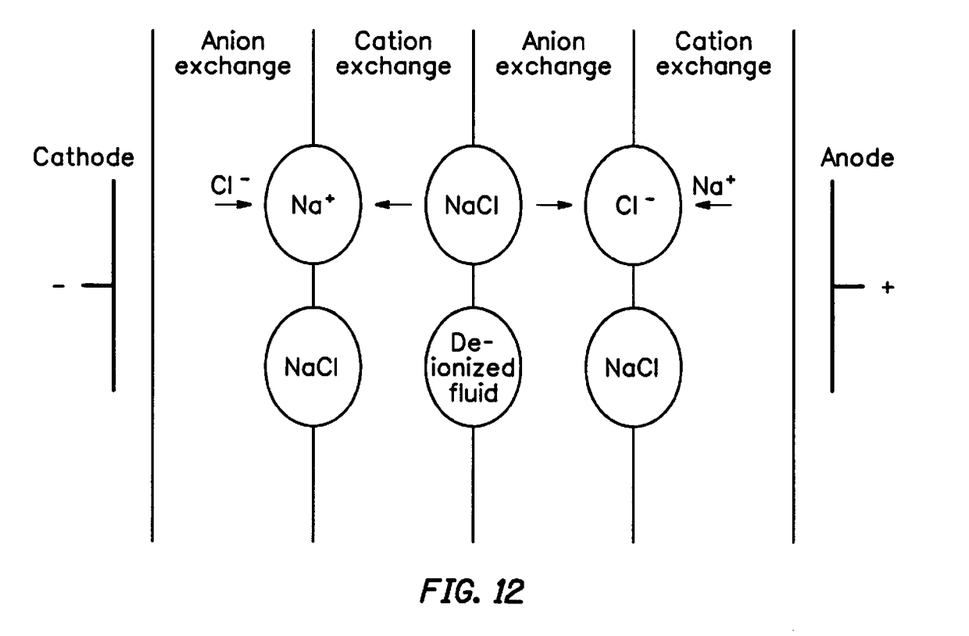
FIG. 12 is a schematic diagram of an apparatus have a plurality of alternating cation-selective and anion-selective regions with passages therebetween for removing impurities from water.
Figure 13:
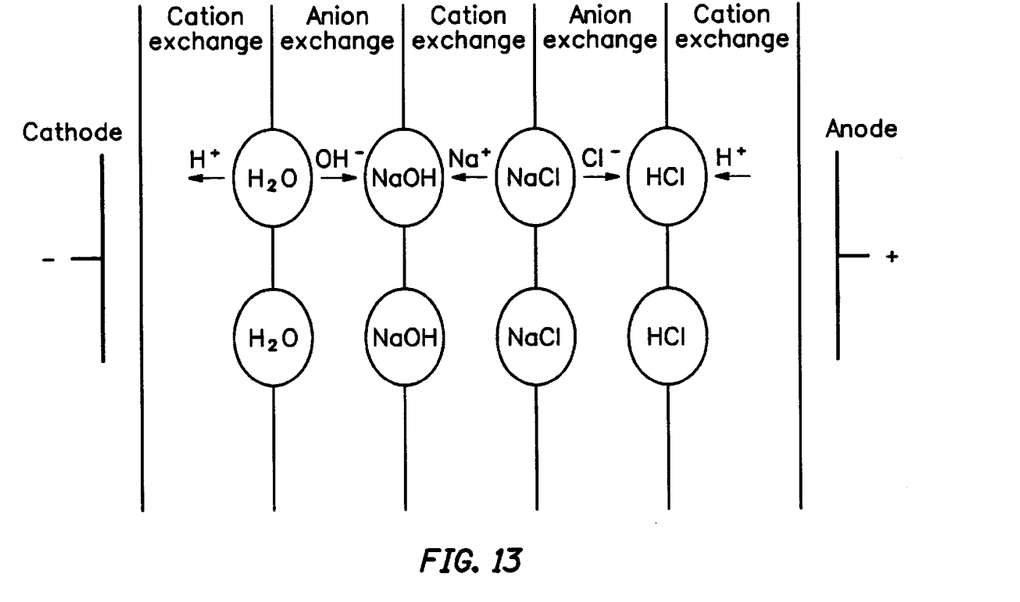
FIG. 13 is a schematic diagram of an apparatus have a plurality of alternating cation-selective and anion-selective regions with passages therebetween for generating acids and bases.

FIG. 12 is a schematic diagram of an apparatus have a plurality of alternating cation-selective and anion-selective regions with passages therebetween for removing impurities from water. FIG. 13 is a schematic diagram of an apparatus have a plurality of alternating cation-selective and anion-selective regions with passages therebetween for generating acids and bases. The apparatus of FIGS. 12 and 13 operate analogously with that of FIGS. 11 and 10, respectively, except that the compartments are now defined by passages between additional ion-selective regions.

While the foregoing is directed to the preferred embodiment of the present invention, other and further embodiments of the invention may be devised without departing from the basic scope thereof, and the scope thereof is determined by the claims which follow.

What is claimed is:

1. A bipolar membrane comprising:
   (a) a cation-selective region;
   (b) an anion-selective region in contact with the cation-selective region; and
   (c) a fluid distribution passage within the membrane.

2. The bipolar membrane of claim 1, wherein the contact between the cation-selective region and the anion-selective region defines an interfacial region, and wherein the fluid distribution passage is formed in the interfacial region.

3. The bipolar membrane of claim 1, wherein the passage is formed in the anion-selective region.

4. The bipolar membrane of claim 1, wherein the passage is formed in the cation-selective region.

5. The bipolar membrane of claim 1, wherein the cation-selective region comprises a material selected from partially or fully fluoronated polymers having carboxylic or sulfonic acid functional groups, copolymers of ethylene with acrylic acid, copolymers of ethylene with methacrylic acid, styrene polymers having carboxylic acid functional groups or sulfonic acid functional groups, divinylbenzene polymers having carboxylic acid functional groups or sulfonic acid functional groups, derivatives thereof or mixtures thereof.

6. The bipolar membrane of claim 1, wherein the anion-selective region comprises a material selected from polymers having partially or fully fluoronated primary chains, saturated hydrocarbon primary chains, partially unsaturated primary chains, aromatic or partially aromatic primary chains, or saturated primary chains containing hetero atoms with functional groups selected from positively charged functionalities, amino groups, amine groups, or derivatives thereof.

7. The bipolar membrane of claim 1, wherein the fluid distribution passage is open and substantially unobstructed.

8. The bipolar membrane of claim 7, wherein the fluid distribution passage has a cross-sectional profile that is curvilinear.

9. The bipolar membrane of claim 8, wherein the curvilinear cross-sectional profile is selected from ovals, circles or ellipses.

10. The bipolar membrane of claim 1, wherein the fluid distribution passage comprises a water-permeable material.

11. The bipolar membrane of claim 1, wherein the fluid distribution passage comprises a wicking material.

12. A bipolar membrane comprising a plurality of alternating cation-selective regions and anion-selective regions, each region disposed in contact with adjacent regions, and fluid distribution passages within at least two of the regions.

13. The bipolar membrane of claim 12, wherein the fluid distribution passages define at least one diluting compartment and at least one concentrating compartment.

14. An apparatus, comprising:
   an anode;
   a cathode; and
   a bipolar membrane having a cation-selective region, an anion-selective region contacting the cation-selective region and a fluid distribution passage within the membrane.

15. The apparatus of claim 14, wherein the contact between the cation-selective region and anion-selective region defines an interfacial region, and wherein the fluid distribution passage is formed in the interfacial region.

16. The apparatus of claim 14, wherein the fluid distribution passage is open and substantially unobstructed.

17. The apparatus of claim 14, wherein the fluid distribution passage comprises a fluid-permeable material.

18. The apparatus of claim 14, wherein the fluid distribution passage comprises a wicking material.

19. The apparatus of claim 14, wherein the anion-selective region of the bipolar membrane faces in the direction of the anode and the cation-selective region of the bipolar membrane faces in the direction of the cathode.

20. The apparatus of claim 19, further comprising a liquid source in fluid communication with the fluid distribution passage.

21. The apparatus of claim 20, wherein the liquid source contains a salt.

22. The apparatus of claim 20, wherein the liquid source contains an ionic impurity.

23. The apparatus of claim 19, comprising a plurality of bipolar membranes.

24. The apparatus of claim 19, further comprising:
   a liquid source containing a salt solution in fluid communication with a first plurality of bipolar membranes;

a liquid source containing water in fluid communication with a second plurality of bipolar membranes, wherein the first and second pluralities of bipolar membranes are disposed in an alternating sequence.

25. The apparatus of claim 19, further comprising a cation-selective membrane disposed adjacent the anion-selective region of the bipolar membrane.

26. The apparatus of claim 19, further comprising an anion-selective membrane disposed adjacent the cation-selective region of the bipolar membrane.

27. The apparatus of claim 14, wherein the cation-selective region of the bipolar membrane faces in the direction of the anode and the anion-selective region of the bipolar membrane faces in the direction of the cathode.

28. The apparatus of claim 14, further comprising a source of liquid in fluid communication with the fluid distribution passage, wherein the source of liquid is selected from aqueous liquids, non-aqueous liquids or mixtures thereof.

29. The apparatus of claim 14, further comprising a compartment adjacent the anion-selective side of the bipolar membrane, wherein the compartment is in fluid communication with a resin bed.

30. The apparatus of claim 14, further comprising a compartment adjacent the cation-selective side of the bipolar membrane, wherein the compartment is in fluid communication with a resin bed.

31. The apparatus of claim 30, wherein the resin bed is disposed within the compartment.

32. The apparatus of claim 30, wherein the resin bed is disposed outside the compartment.

33. A bipolar membrane, comprising: an anion-selective region, a cation-selective region, an interfacial region between the anion-selective region and the cation-selective region, and means for delivering a fluid directly into the interfacial region.

* * * * *